(12) United States Patent
Richter et al.

(10) Patent No.: US 12,699,628 B2
(45) Date of Patent: Aug. 4, 2026

(54) MAINTAINING INTEGRITY OF CONFIGURATION DATA FOR MEMORY SYSTEMS

(71) Applicant: Micron Technology, Inc., Boise, ID (US)

(72) Inventors: Michael Dieter Richter, Ottobrunn (DE); Thomas Hein, Munich (DE); Casto Salobrena Garcia, Munich (DE)

(73) Assignee: Micron Technology, Inc., Boise, ID (US)

( * ) Notice: Subject to any disclaimer, the term of this patent is extended or adjusted under 35 U.S.C. 154(b) by 77 days.

(21) Appl. No.: 18/763,967

(22) Filed: Jul. 3, 2024

(65) Prior Publication Data

US 2025/0028598 A1     Jan. 23, 2025

Related U.S. Application Data

(60) Provisional application No. 63/527,539, filed on Jul. 18, 2023.

(51) Int. Cl.
*G06F 11/10* (2006.01)
*G06F 11/14* (2026.01)

(52) U.S. Cl.
CPC ........ *G06F 11/1056* (2013.01); *G06F 11/141* (2013.01)

(58) Field of Classification Search
CPC ............... G06F 11/1056; G06F 11/141; G06F 11/1004; G06F 11/1048

(Continued)

(56) References Cited

U.S. PATENT DOCUMENTS 7,191,379 B2 *   3/2007  Adelmann .......... G06F 11/1008
                                                        365/201
10,432,231 B2 *  10/2019  Suzuki .................. G06F 3/0679
(Continued)

FOREIGN PATENT DOCUMENTS

CN         112349342 A      2/2021
CN         115083498 A      9/2022
WO      2013/095518 A1     6/2013

OTHER PUBLICATIONS

"International Search Report and Written Opinion of the International Searching Authority," issued in connection with Int'l Appl. No. PCT/US2024/037094, dated Oct. 16, 2024 (9 pages).

*Primary Examiner* — James C Kerveros
(74) *Attorney, Agent, or Firm* — Holland & Hart LLP

(57)     ABSTRACT

Methods, systems, and devices for maintaining integrity of configuration data for memory devices are described. A memory system may implement an error control component configured to detect errors in configuration data stored to one or more mode registers. The error control component may be configured to generate error control information, including one or more parity bits or a checksum, associated with the configuration data. The memory system or a host system coupled with the memory system may be configured to detect errors in the configuration data based on the error control information. Based on detecting the errors, the memory system may enter a safe mode, in which the memory system refrains from performing access operations until the configuration data is rewritten to the one or more mode registers.

20 Claims, 7 Drawing Sheets

(58) Field of Classification Search
  USPC ........................................................ 714/764
  See application file for complete search history.

(56) References Cited

U.S. PATENT DOCUMENTS

| | | | |
|---|---|---|---|
| 2009/0013219 A1* | 1/2009 | Kitaoka | .............. G06F 15/7867 |
| | | | 714/E11.002 |
| 2014/0215139 A1 | 7/2014 | Pekny et al. | |
| 2018/0081754 A1* | 3/2018 | Berman | ................ G06F 11/108 |
| 2019/0324852 A1* | 10/2019 | Bando | .................... G11C 29/52 |
| 2022/0100604 A1 | 3/2022 | Mayer et al. | |
| 2024/0211347 A1* | 6/2024 | Mirichigni | .......... G06F 11/1068 |

* cited by examiner

300

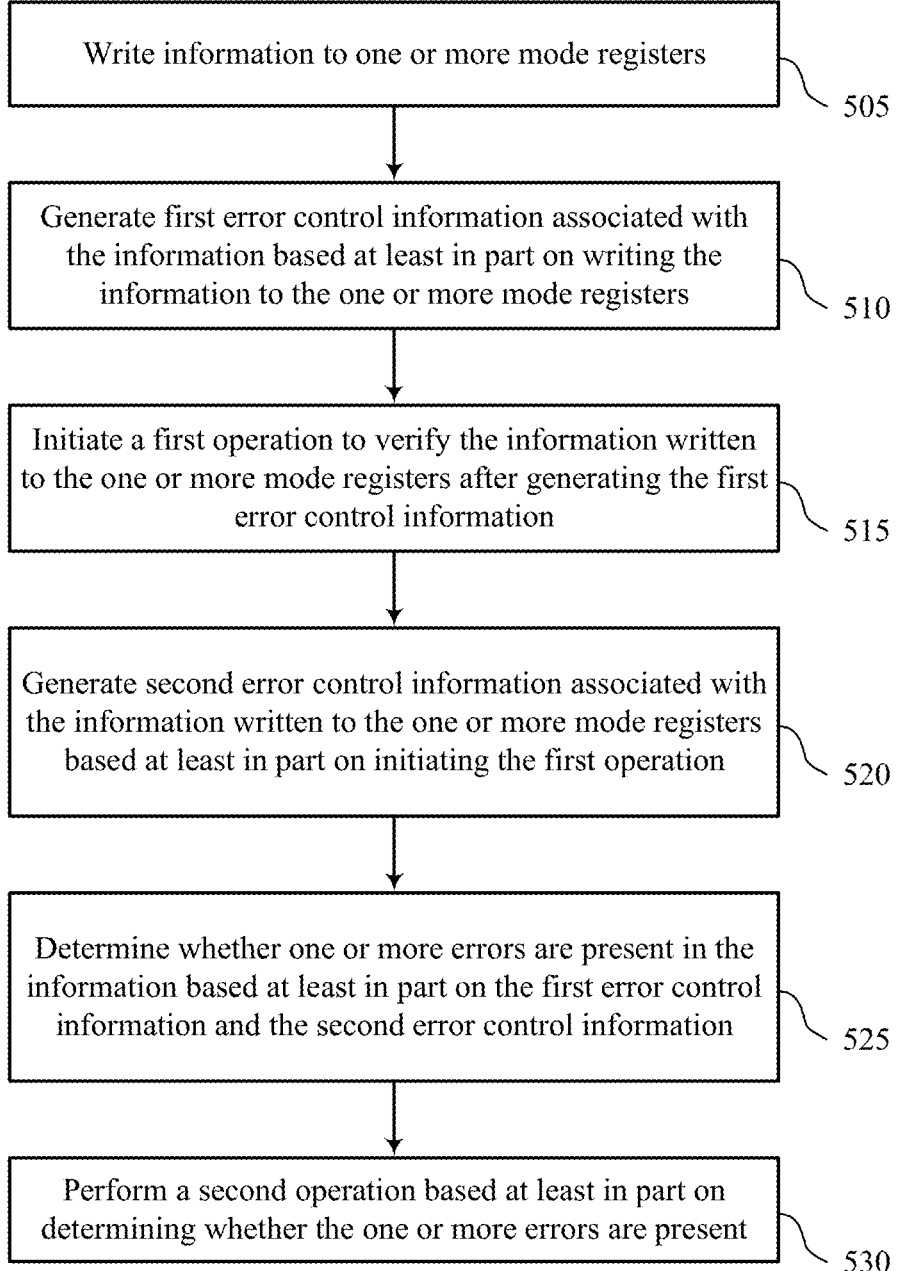

Write information to one or more mode registers — 505

Generate first error control information associated with the information based at least in part on writing the information to the one or more mode registers — 510

Initiate a first operation to verify the information written to the one or more mode registers after generating the first error control information — 515

Generate second error control information associated with the information written to the one or more mode registers based at least in part on initiating the first operation — 520

Determine whether one or more errors are present in the information based at least in part on the first error control information and the second error control information — 525

Perform a second operation based at least in part on determining whether the one or more errors are present — 530

MAINTAINING INTEGRITY OF CONFIGURATION DATA FOR MEMORY SYSTEMS

CROSS REFERENCE

The present Application for Patent claims priority to U.S. Patent Application No. 63/527,539 by Richter et al., entitled "MAINTAINING INTEGRITY OF CONFIGURATION DATA FOR MEMORY SYSTEMS," filed Jul. 18, 2023, which is assigned to the assignee hereof, and which is expressly incorporated by reference in its entirety herein.

TECHNICAL FIELD

The following relates to one or more systems for memory, including maintaining integrity of configuration data for memory systems.

BACKGROUND

Memory systems are used to store information in devices such as computers, user devices, wireless communication devices, cameras, digital displays, and others. Information is stored by programming memory cells within a memory system to various states. For example, binary memory cells may be programmed to one of two supported states, often denoted by a logic 1 or a logic 0. In some examples, a single memory cell may support more than two states, any one of which may be stored by the memory cell. To store information, a memory system may write (e.g., program, set, assign) states to the memory cells. To access stored information, a memory system may read (e.g., sense, detect, retrieve, determine) states from the memory cells.

BRIEF DESCRIPTION OF THE DRAWINGS

FIG. 5 shows a flowchart illustrating a method or methods that support maintaining integrity of configuration data for memory systems in accordance with examples as disclosed herein.

DETAILED DESCRIPTION

Figure 1:
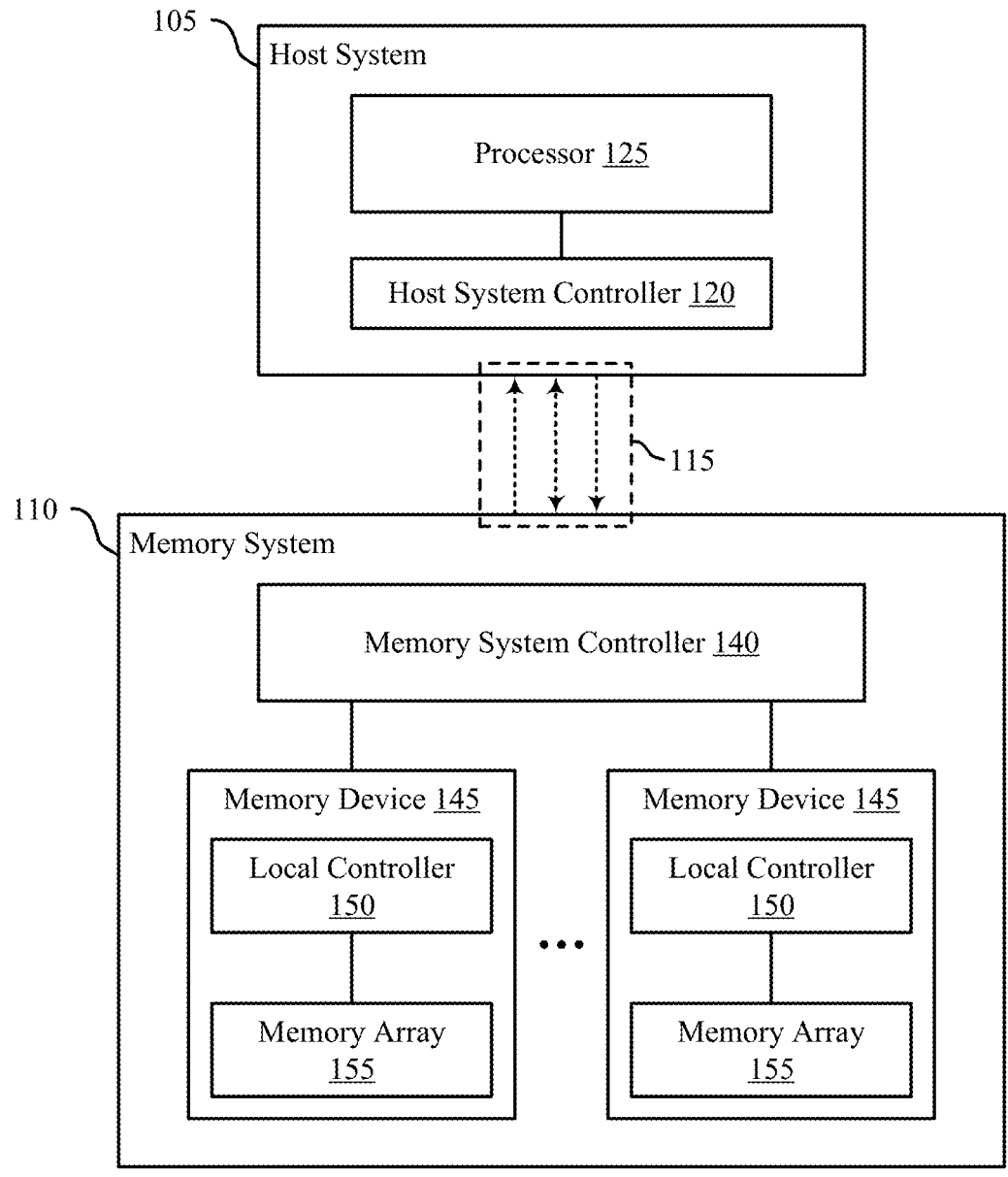
FIG. 1 shows an example of a system that supports maintaining integrity of configuration data for memory systems in accordance with examples as disclosed herein.

Some memory systems may implement one or more mode registers configured to store information (e.g., configuration data) associated with operating the memory system. For example, the one or more mode registers may be written (e.g., in response to a mode register write command from a host system) with configuration data during or after powering up the memory system (e.g., transitioning the memory system from a lower power state to a higher power state). However, in some cases, the configuration data stored to the one or more mode registers may be unintentionally modified, causing errors in the configuration data. For example, alpha particles, voltage fluctuations, device degradation of the memory system, or process variations or partial damage during assembling the memory system (e.g., not discovered during final testing of the volatile memory system) may introduce errors into the configuration data. However, errors in the configuration data may adversely affect operations of the memory system by, for example, causing data loss (e.g., due to changes of programmed refresh intervals) and disabling processing of read and write requests (e.g., due to changes of programmed write or read latencies). Further, the memory system may not be configured to identify errors in the configuration data nor transmit an indication of the errors to a host system, thereby resulting in a lack of error detection and correction capability of the configuration data.

In accordance with examples as described herein, a memory system may implement an error control component configured to detect errors in configuration data stored to one or more mode registers. The error control component may be configured to generate error control information (e.g., one or more parity bits, a checksum) associated with the configuration data and the memory system or a host system coupled with the memory system may be configured to detect errors in the configuration data based on the error control information. For example, the error control component may generate first error control information after the configuration data is written to the one or more mode registers, then generate second error control information based on initiating a verification operation (e.g., in response to rewriting the configuration data, in response to receiving a verification request, in response to a periodic duration elapsing). In some such examples, the memory system or the host system may compare the first error control information and the second error control information to determine whether errors are present in the configuration data. Based on detecting the errors, the memory system may enter a safe mode, in which the memory system refrains from performing access operations until the configuration data is rewritten to the one or more mode registers. After configuration data is re-written, the memory system may exit the safe mode. Implementing the error control component in the memory system may enable error detection and correction of the configuration data, thereby improving reliability of the memory system, among other advantages.

Features of the disclosure are illustrated and described in the context of systems. Features of the disclosure are further illustrated and described in the context of a process flow, a block diagram, and a flowchart.

FIG. 1 illustrates an example of a system 100 that supports maintaining integrity of configuration data for memory systems in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, one or more processing components) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system

110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 may be dedicated to communicating one or more types of information, and channels 115 may include unidirectional channels, bidirectional channels, or both. For example, the channels 115 may include one or more command/address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

A command/address channel (e.g., a CA channel) may be operable to communicate commands between the host system 105 and the memory system 110, including control information associated with the commands (e.g., address information, configuration information). Commands carried by a command/address channel may include a write command with an address for data to be written to the memory system 110 or a read command with an address for data to be read from the memory system 110.

A clock signal channel may be operable to communicate one or more clock signals between the host system 105 and the memory system 110. Clock signals may oscillate between a high state and a low state, and may support coordination (e.g., in time) between operations of the host system 105 and the memory system 110. In some examples, a clock signal may provide a timing reference for operations of the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

A data channel (e.g., a DQ channel) may be operable to communicate (e.g., bidirectionally) information (e.g., data, control information) between the host system 105 and the memory system 110. For example, a data channel may communicate information from the host system 105 to be written to the memory system 110, or information read from the memory system 110 to the host system 105. In some examples, channels 115 may include one or more error detection code (EDC) channels. An EDC channel may be operable to communicate error detection signals, such as checksums or parity bits, which may accompany information conveyed over a data channel.

In some cases, a memory device 145 may implement an error control component configured to detect errors in configuration data stored to one or more mode registers. The error control component may be configured to generate error control information (e.g., one or more parity bits, a checksum) associated with the configuration data and the memory device 145 or the host system 105 may be configured to detect errors in the configuration data based on the error control information. For example, the error control component may generate first error control information after the configuration data is written to the one or more mode registers, then generate second error control information based on initiating a verification operation (e.g., in response to rewriting the configuration data, in response to receiving a verification request, in response to a periodic duration elapsing). In some such examples, the memory device 145 or the host system 105 may compare the first error control information and the second error control information to determine whether errors are present in the configuration data. Based on detecting the errors, the memory device 145 may enter a safe mode, in which the memory device 145 refrains from performing access operations until the configuration data is rewritten to the one or more mode registers; whereafter the memory device 145 may exit the safe mode. Implementing the error control component in the memory device 145 may enable error detection and correction of the configuration data, thereby improving reliability of the system 100, among other advantages.

In addition to applicability in systems described herein, techniques for maintaining integrity of configuration data for memory devices may be generally implemented to improve security and/or authentication features of various electronic devices and systems. For example, as the use of electronic devices for handling private, user, or other sensitive information has become increasingly widespread, electronic devices and systems have become the target of increasingly frequent and sophisticated attacks. Unauthorized access or modification of data in devices such as vehicles, healthcare devices, and others may be detrimental for various reasons. Implementing the techniques described herein may improve the security of electronic devices and systems by enabling error detection and correction of configuration data associated with operating a memory system, thereby improving security and reliability of the memory system, among other benefits.

Figure 2A:
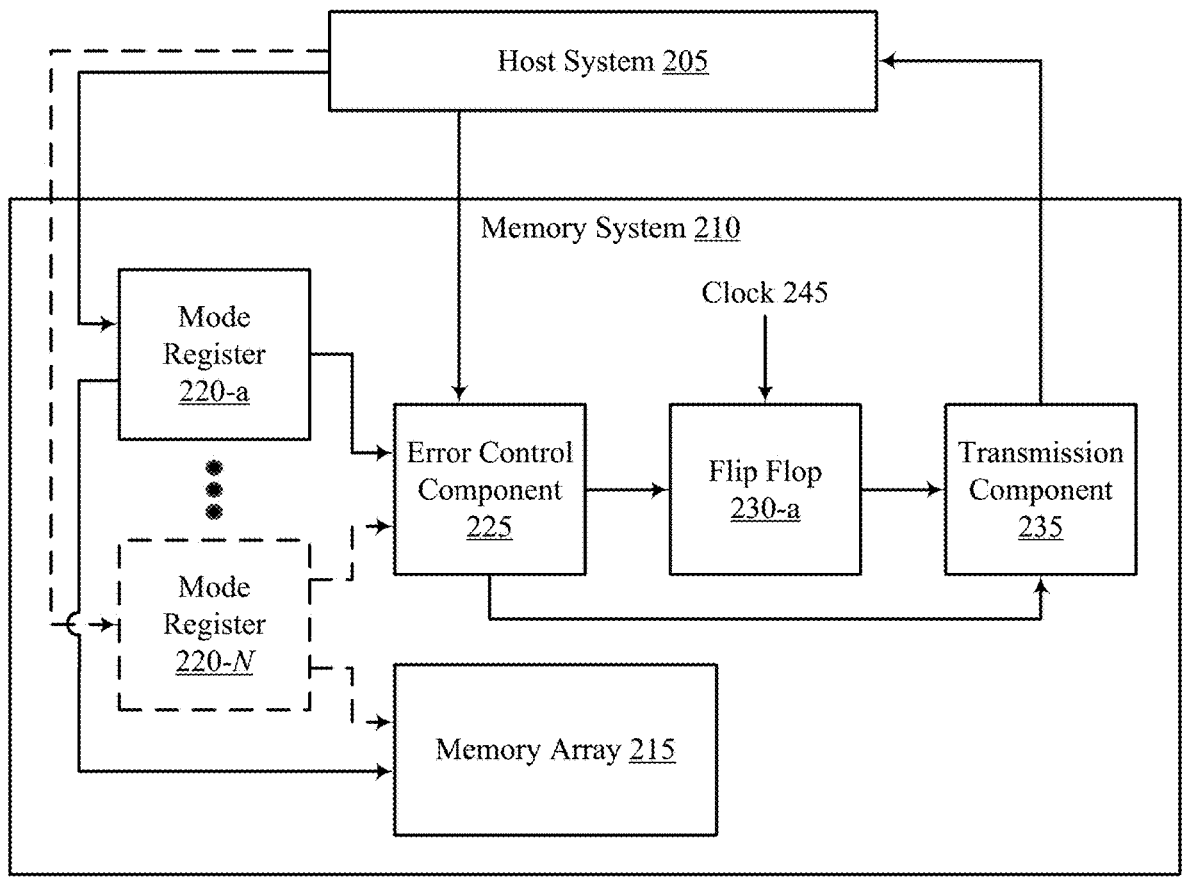
FIGS. 2A and 2B show examples of systems that support maintaining integrity of configuration data for memory systems in accordance with examples as disclosed herein.
Figure 2B:
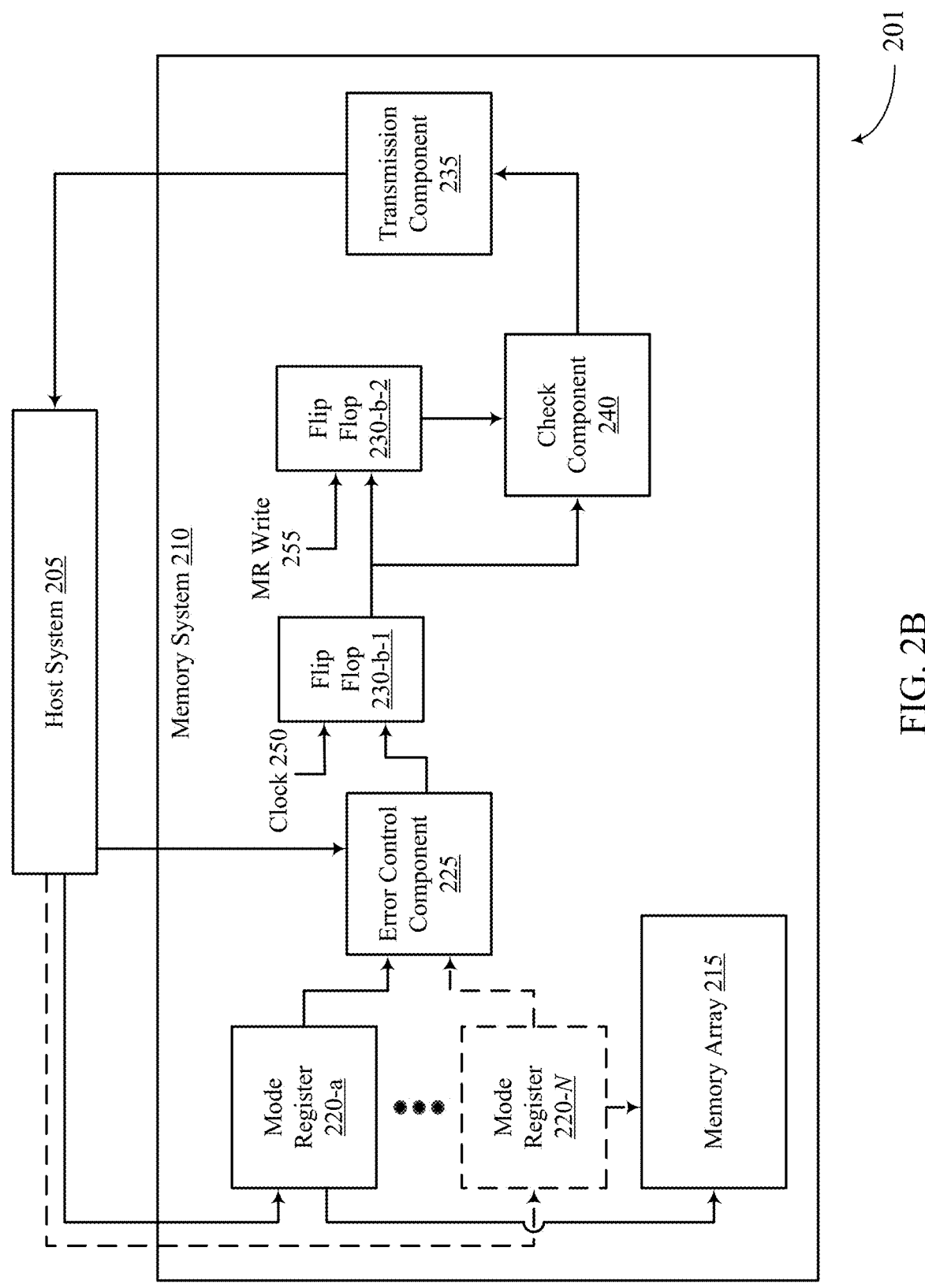

FIGS. 2A and 2B show an example of systems 200 and 201 that support maintaining integrity of configuration data for memory systems in accordance with examples as disclosed herein. The systems 200 and 201 may implement aspects or operations of a system 100 as described with reference to FIG. 1. For example, the systems 200 and 201 may implement a host system 205 and a memory system 210, which may be examples of a host system 105 and a memory system 110, respectively, as described with reference to FIG. 1. The memory system 210 may support error detection and correction of configuration data associated with operating the memory system 210.

The host system 205 may be coupled with the memory system 210, and may include one or more controllers associated with facilitating operations of the memory system 210, such as a host system controller 120, as described with reference to FIG. 1. The memory system 210 may be an example of the memory system 110. In some cases, the memory system 210 may be an example of the memory device 145 such that the memory system 210 may be a volatile memory device implementing a memory array 215 (e.g., which may be an example of a memory array 155, as described with reference to FIG. 1) and one or more controllers (e.g., not shown, which may be examples of a local controller 150, as described with reference to FIG. 1) coupled with the host system 205, and the components depicted in FIGS. 2A and 2B (e.g., in the memory system 210) may be included in each of the memory devices 145. In some examples, the memory system 210 may implement multiple memory devices 145. The memory array 215 may be a volatile memory array (e.g., a DRAM array), and may include a quantity of volatile memory cells (e.g., DRAM cells) configured to store data (e.g., user data).

The memory system 210 may include one or more mode registers 220 (e.g., mode register 220-*a* to mode register 220-N), each configured to store configuration data associated with operating the memory system 210. For example, the one or more mode registers 220 may be coupled with the memory array 215 and the configuration data stored to the one or more mode registers 220 may support accessing the memory array 215, among other processes. In some cases, the host system 205 may be configured to write (e.g., store) the configuration data to the one or more mode registers 220 via one or more channels (e.g., data channels, command channels) coupling the host system 205 with the one or more mode registers 220. In some examples, a controller of the memory system 210 may facilitate writing the configuration data to the one or more mode registers 220. In some such cases, the host system 205 may transmit a mode register write (e.g., set) command to the one or more mode registers 220, where the mode register write command may include the configuration data and an indication of corresponding addresses for writing the configuration data to the one or more mode registers 220. The one or more mode registers 220 may accordingly store the configuration data after receiving the mode register write command. In some cases, the configuration data may be written to the one or more mode registers 220 based on powering up (e.g., initializing) the memory system 210, which may include transitioning the memory system 210 from a lower power state to a higher power state. In some such cases, the mode register write command may be transmitted to the memory system 210 during or after powering up the memory system 210.

The memory system 210 may include an error control component 225 configured to facilitate error detection and/ or correction of the configuration data stored in the one or more mode registers 220. The error control component 225 may generate error control information associated with the configuration data based on inputting the configuration data from the one or more mode registers 220. In some cases, the error control information may be one or more parity bits for the configuration data. In other cases, the error control information may be a checksum for the configuration data, and generating the checksum may include performing a quantity of logic operations (e.g., XOR operations). For example, the configuration data may be input to a set of logic operations, then the results of the set of logic operations may be input to another set of logic operations, and so forth, until generating the checksum. The configuration data and the error control information may have different sizes, such that the configuration data may be larger than the error control information. In some cases, the error control component 225 may be configured to generate the error control information after writing the configuration data to the one or more mode registers 220. Additionally, or alternatively, the error control component 225 may be configured to generate the error control information during a verification operation of the configuration data. For example, the error control component 225 may generate the error control information after receiving a verification request from the host system 205, based on clock signaling, or after identifying a periodic duration for performing the verification operation has elapsed (e.g., satisfied a threshold).

FIG. 2A depicts the memory system 210 including a flip flop 230-*a* (e.g., or another component configured to store one or more bits of error control information) coupled with the error control component 225 and configured to store the error control information (e.g., one or more bits of the error control information). For example, the flip flop 230-*a* may be configured to store error control information generated after writing the configuration data to the one or more mode registers 220. The flip flop 230-*a* may be configured to transmit the error control information to a transmission component 235 (e.g., a driver) configured to transmit signaling to the host system 205. For example, the flip flop 230-*a* may transmit the error control information to the transmission component 235, and the transmission component 235 may transmit the error control information to the host system 205, such that the host system 205 may use the error control information to determine whether errors are present in the configuration data.

In some cases, the flip flop 230-*a* may store the error control information based on clock signaling. In some cases, the clock signaling may an example of signaling from the host system 205. For example, the flip flop 230-*a* may continually receive the output of the error control component 225 at a first input of the flip flop 230-*a*. A signal from clock 245 may input to a second input of the flip flop 230-*a*. In response to the signal from the clock 245 changing state (e.g., going high or low based on the configuration of the flip flop 230-*a*), the flip flop 230-*a* may store the output of the error control component being received at the first input. Thus, on a periodic basis (based on the clock 245) the flip flop 230-*a* may store updated error control information. The transmission component 235 may then read the contents of the flip flop 230-*a* and transmit the error control information in response to a trigger event to do such an operation. In some cases, the memory system 210 may transmit the error control information based on signaling from the host system 205. In some cases, the flip flop 230-*a* may store the error control information on a frequency according to clock signaling (e.g., clock 245) or mode register write signaling corresponding to the mode register write command. For example, the flip flop 230-*a* may transmit the error control information based on clock signaling received from the host system 205 (e.g., via a clock signal channel), or based on mode register write signaling received from the host system 205 (e.g., via a clock signal channel).

FIG. 2B depicts the memory system 210 including flip flop 230-*b*-1 and flip flop 230-*b*-2 configured to store multiple copies of the error control information. For example, the flip flop 230-*b*-1 may be configured to store the current error control information generated by the error control component 225. The flip flop 230-*b*-1 may continually receive the output of the error control component 225 at a first input of the flip flop 230-*b*-1. A clock signal 250 may be input to a second input of the flip flop 230-*b*-1. In response to the clock signal 250 changing state (e.g., going high or low based on the configuration of the flip flop 230-*b*-1), the flip flop 230-*b*-1 may store the output of the error control component 225 being received at the first input. Thus, on a periodic basis (based on the clock signal 250) the flip flop 230-*b*-1 may store updated error control information. The clock signal 250 may be an example of a clock signal associated with the memory system 210.

The flip flop 230-*b*-2 may be configured to store previous error control information that occurred at a triggering event, such as a verification operation of the configuration data. In some cases, a triggering event may include when the memory system 210 receives a mode register write command, such as a mode register write signal 255. In some cases, the triggering event may be based on a clock signal that has a different periodicity than the clock signal 250. The flip flop 230-*b*-2 may continually receive the output of the flip flop 230-*b*-1 at a first input of the flip flop 230-*b*-2. A mode register write signal 255 may be input to a second input of the flip flop 230-*b*-2. In response to the mode register write signal 255 changing state (e.g., going high or low based on the configuration of the flip flop 230-*b*-2), the flip flop 230-*b*-2 may store the output of the flip flop 230-*b*-1 being received at the first input. Thus, in response to a triggering event associated with the mode register write signal 255, the flip flop 230-*b*-2 may store updated error control information. In some cases, the memory system 210 may be configured to verify the contents of the mode registers 220 at a triggering event (e.g., in response to a mode register write command). In such cases, the flip flop 230-*b*-2 stores the value of the error control information used at the last verification operation.

The flip flops 230-*b*-1 and 230-*b*-2 may be configured to output the current error control information (stored at flip flop 230-*b*-1) and the previous error control information (stored at flip flop 230-*b*-2) to a check component 240 configured to compare the new error control information and the previous error control information. A transmission component 235 (e.g., a driver) may be configured to transmit signaling to the host system 205 that relates to the output of the check component 240. For example, the flip flops 230-*b*-1 and 230-*b*-2 may transmit the new error control information and the previous error control information to check component 240, that may perform its operations and output the results of the comparison to the transmission component 235. The transmission component 235 may transmit an indication of the new error control information and/or the previous error control information to the host system 205, such that the host system 205 may use the error control information and the error control information to determine whether errors are present in the configuration data.

In some cases, the flip flops 230-*b*-1 and 230-*b*-2 may transmit the new error control information and the previous error control information to the check component 240, and the check component 240 may perform a comparison of the new error control information and the previous error control information to determine whether errors are present in the configuration data. For example, the check component 240 may identify one or more differences between the new error control information and the previous error control information based on performing the comparison, and may transmit an indication to the transmission component 235 that one or more errors are present in the configuration data. In some implementations, performing the comparison may include performing a bit-wise logic XOR operation using the new error control information and the previous error control information. Then, the transmission component 235 may transmit the indication to the host system 205.

In accordance with examples as described herein, implementing the error control component 225 to generate the error control information may support error detection and correction of the configuration data. Implementing error detection and correction of the configuration data may prevent data loss at the memory array 215 and support access operations of the memory array 215, among facilitating other operations. Additionally, communicating detected errors between the memory system 210 and the host system 205 may improve transparency and communication of the systems 200 and 201, thereby improving reliability of the systems 200 and 201.

Figure 3A:
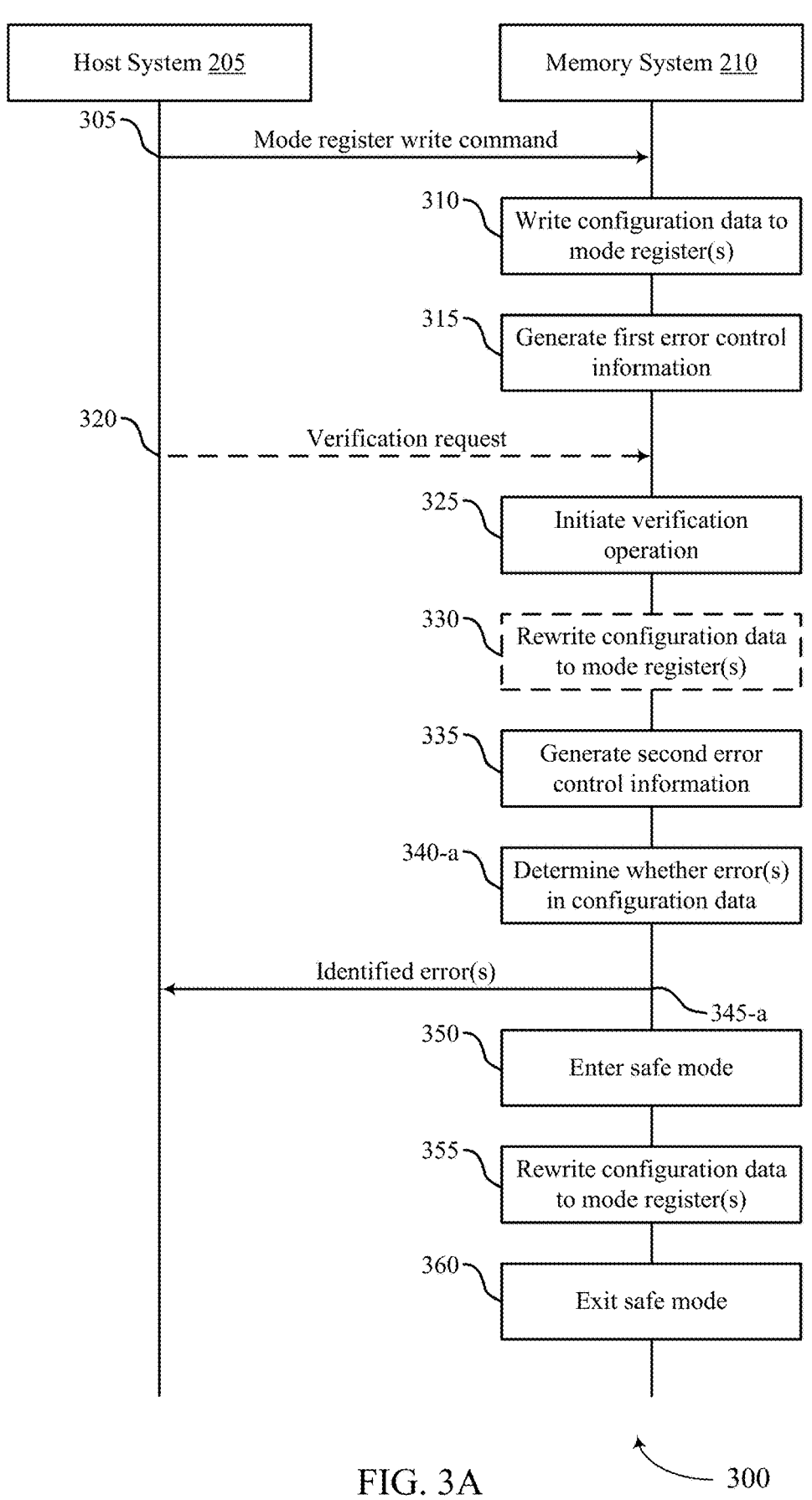
FIGS. 3A and 3B show examples of process flows that support maintaining integrity of configuration data for memory systems in accordance with examples as disclosed herein.
Figure 3B:
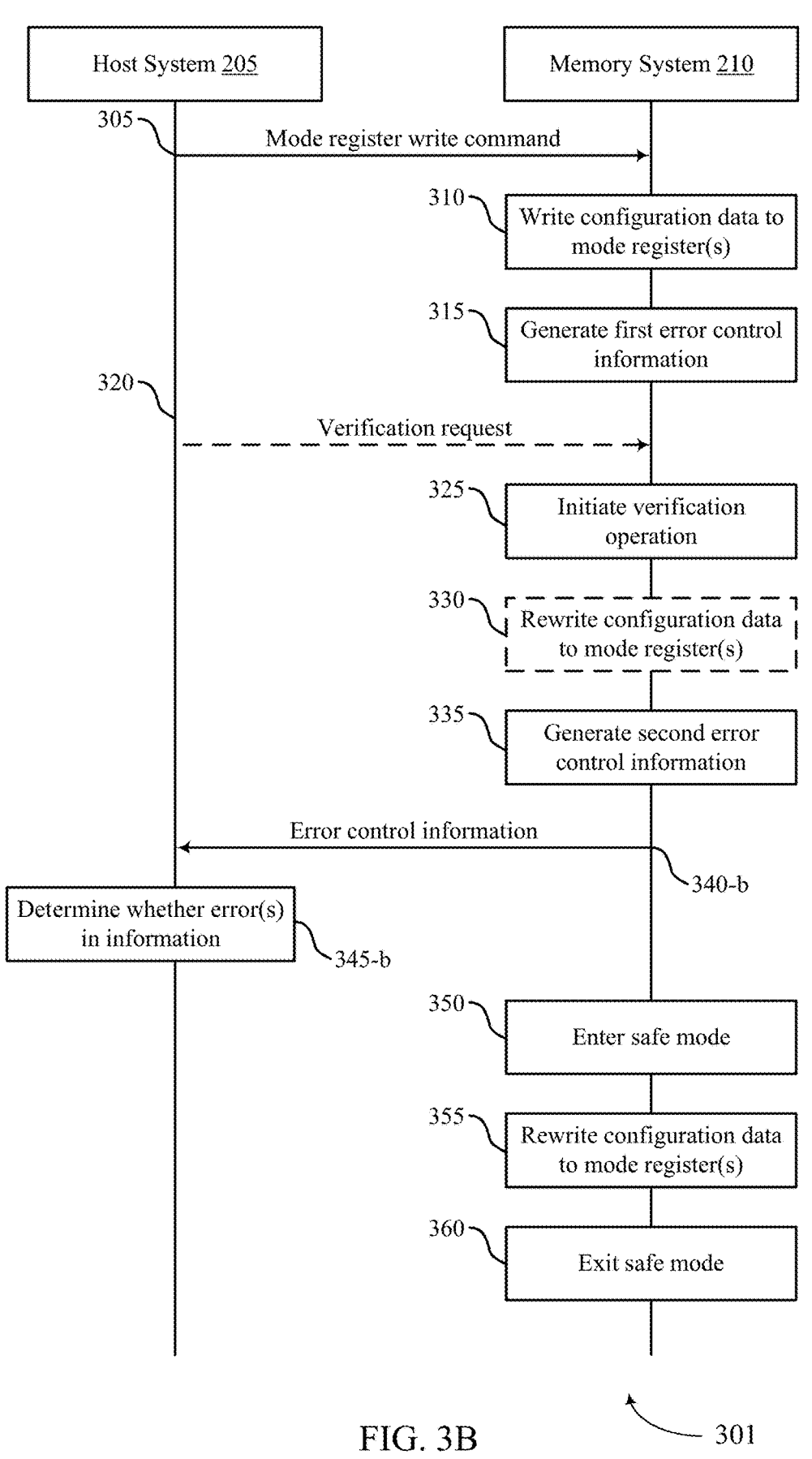

FIGS. 3A and 3B show examples of process flows 300 and 301 that support maintaining integrity of configuration data for memory systems in accordance with examples as disclosed herein. The process flows 300 and 301 may illustrate aspects or operations of a system, which may be an example of a system 200, as described with reference to FIGS. 2A and 2B. For example, the process flows 300 and 301 may be implemented by a host system 205 and a memory system 210, as described with reference to FIGS. 2A and 2B. In the following description of the process flows 300 and 301, some methods, techniques, processes, and operations may be performed in different orders or at different times. Further, some operations may be left out of the process flows 300 and 301, or other operations may be added to the process flows 300 and 301.

FIG. 3A depicts a process flow 300 describing operations for a memory system to determine whether errors are present in configuration data. FIG. 3B depicts a process flow 301 describing operations for a host system to determine whether errors are present in configuration data. For example, FIG. 3A depicts the process flow 300 with steps 340-*a* and 345-*a* whereas FIG. 3B depicts the process flow 301 with steps 340-*b* and 345-*b* (e.g., in place of steps 340-*a* and 345-*a*); otherwise steps 305 through 335 and 350 through 360 are similar in both depictions of the process flows 300 and 301. In accordance with FIG. 3A, the process flow 300 may continue from step 335 to steps 340-*a* through 360, as described herein. However, in accordance with FIG. 3B, the process flow 301 may continue from step 335 to steps 340-*b* through 360, as described herein. For clarity, each variation of the process flows 300 and 301 are described herein. In some examples, the process flows 300 and 301 may proceed in accordance with FIG. 3A to step 340-*a* or in accordance with FIG. 3B to step 340-*b*, based on the host system 205 transmitting a command indicating the memory system 210 to proceed in accordance with either 340-*a* or 340-*b*. In some examples, the memory system 210 may be initially configured (e.g., set, predetermined) to proceed with either 340-*a* or 340-*b* during powering up.

Aspects of the process flows 300 and 301 may be implemented by a controller (e.g., a controller of the host system 205, a controller of the memory system 210), among other components. Additionally, or alternatively, aspects of the process flows 300 and 301 may be implemented as instructions stored in memory (e.g., firmware). For example, the instructions, if executed by the controller, may cause the controller to perform the operations of the process flows 300 and 301. The process flows 300 and 301 may depict operations associated with performing an error control operation to verify configuration data stored in one or more mode registers.

The following description of the process flow 300 is described with reference to FIG. 3A. The process flow 300 may be associated with the system 201 described with reference to FIG. 2B.

At 305, a mode register write command may be received at the memory system 210. The host system 205 may transmit the mode register write command to the memory system 210 after powering up the memory system 210, which may include transitioning the memory system 210 from a lower power state to a higher power state. The mode register write command may include configuration data and corresponding addresses of one or more mode registers (e.g., mode registers 220, as described with reference to FIGS. 2A and 2B) of the memory system 210 for storing the configuration data.

At 310, the configuration data may be written to the one or more mode registers. In some cases, the host system 205 may write the configuration data to the one or more mode registers. In other cases, a controller of the memory system 210 may facilitate writing the configuration data to the one or more mode registers.

At 315, first error control information may be generated. For example, an error control component (e.g., an error control component 225, as described with reference to FIGS. 2A and 2B) of the memory system 210 may generate the first error control information. The first error control information may be associated with the configuration data, and may include one or more parity bits of the configuration data, or a checksum of the configuration data. In some cases, generating the first error control information may include performing a quantity of logic operations associated with determining the first error control information. In some examples, the first error control information may be stored to a flip flop (e.g., a flip flop 230-*a*, as described with reference to FIG. 2A, a flip flop 230-*b*-1, as described with reference to FIG. 2B) coupled with the error control component. In some such examples, the first error control information may be stored to the flip flop based on receiving signaling from the host system 205. For example, the first error control information may be stored to the flip flop based on receiving mode register write signaling corresponding to the mode register write command received at step 305 of the process flow 300.

At 320, a verification request may be received at the memory system 210. For example, the host system 205 may transmit the verification request to the memory system 210 to initiate a verification operation. In other examples, the memory system may initiate a verification operation without receiving a request from a host system. The verification request may be an example of a triggering event. In some cases, the verification request may be an example of mode register write command.

At 325, the verification operation may be initiated at the memory system 210. Such a verification operation may be initiated based on the verification request or it may be initiated based on some other triggering event. The verification operation may include performing processes supporting error detection and correction of the configuration data. For example, the verification operation may include determining whether one or more errors are present in the configuration data. In other cases, the verification operation may be initiated (e.g., by the memory system 210) based on determining that a periodic duration since performing a previous verification operation has elapsed (e.g., satisfied a threshold duration).

At 330, the configuration data may be rewritten to the one or more mode registers. For example, the configuration data may be refreshed in the one or more mode registers. In some cases, the configuration data may be rewritten based on receiving another mode register write command from the host system 205. In other cases, the configuration data may be rewritten based on determining that a periodic duration since the configuration data was previously written has elapsed (e.g., satisfied a threshold duration).

At 335, second error control information may be generated. For example, the error control component may generate the second error control information based on initiating the verification operation at step 325. In the example of the system 201, new error control information may be generated and stored in flip flop 230-*b*-1 and previous error control information may be stored in flip flop 230-*b*-2 (e.g., the contents of flip flop 230-*b*-1 may be moved to flip flop 230-*b*-2). The second error control information may be associated with the configuration data, and may include one or more parity bits of the configuration data, or a checksum of the configuration data. In some cases, generating the second error control information may include performing a quantity of logic operations associated with determining the second error control information. In some examples, the error control component may generate the second error control information based on rewriting the configuration data at step 330 of the process flow 300. The second error control information may be stored to flip flops coupled with the error control component, based on receiving clock signaling from the host system 205.

At 340-*a*, the memory system 210 may determine whether one or more errors are present in the configuration data. For example, a check component (e.g., a check component 240, as described with reference to FIG. 2B) of the memory system 210 may compare the first error control information to the second error control information to determine whether one or more errors are present in the configuration data. In some cases, the check component may identify one or more differences (e.g., a mismatch) between the first error control information and the second error control information, thereby determining one or more errors are present in the configuration data. In other cases, the check component may identify the first error control information and the second error control information do not include differences (e.g., match), thereby determining no errors are present in the configuration data.

The check component may receive the first error control information and the second error control information from the respective flip flops, prior to comparing the first error control information and the second error control information. For example, the flip flops may transmit the respective error control information to the check component based on receiving signaling from the host system 205. In some cases, the flip flop storing the first error control information may transmit the first error control information to the check component based on receiving mode register write signaling from the host system 205. Whereas the flip flop storing the second error control information may transmit the second error control information to the check component based on receiving clock signaling from the host system 205. In some examples, the clock signaling may correspond to a periodic duration for performing the verification operation, such that the clock signaling may indicate to transmit the second error control information when the periodic duration has elapsed. In some cases, the check component may be configured to store the first error control information from the flip flop until the second error control information is transmitted to the check component.

At 345-*a*, the host system 205 may receive an indication of whether the configuration includes the one or more errors identified at step 340-*a* of the process flow 300. For example, memory system 210 may determine one or more errors are present in the configuration data and the memory system 210 may transmit an indication of the one or more errors to the host system 205. In some cases, the check component may transmit the indication of the one or more errors to a transmission component (e.g., a driver, a transmission component 235, as described with reference to FIGS. 2A and 2B) of the memory system 210, and the transmission component may transmit the indication from the memory system 210 to the host system 205.

At 350, the memory system 210 may enter a safe mode. The memory system 210 may enter the safe mode based on determining one or more errors are present in the configuration data. In some cases, the memory system 210 may enter the safe mode based on receiving a command from the host system 205 to enter the safe mode, (e.g., based on receiving the indication of the identified errors at step 345-*a* of the process flow 300). While the memory system 210 is in the safe mode, the memory system 210 may refrain from performing access operations. For example, the memory system 210 may suspend access operations until the configuration data is rewritten to the one or more mode registers.

At 355, the configuration data may be rewritten to the one or more mode registers. For example, the host system 205 may send a new mode register write command to the memory system 210, and the configuration data stored in the one or more mode registers may be rewritten with the configuration data from the new mode register write command. In some cases, the configuration data from the new mode register write command may be corrected or verified (e.g., tested) configuration data, based on determining that the one or more errors are present in the configuration data at step 340-*a* of the process flow 300. In some cases, if one or more errors are discovered in the corrected or verified configuration data, this may provide an indication that the one or more errors are resulting from transmitting the configuration data.

At 360, the memory system 210 may exit the safe mode. The memory system 210 may exit the safe mode based on rewriting the configuration data to the one or more mode registers at step 355 of the process flow 300. In some cases, after exiting the safe mode, the memory system 210 may stop refraining from performing access operations. For example, the memory system 210 may end the suspension of access operations based on rewriting the configuration data to the one or more mode registers.

The following description of the process flow 301 is described with reference to FIG. 3B. The process flow 301 may be associated with the system 200 described with reference to FIG. 2A. The following steps 305 through 335 and steps 350 through 360 of the process flow 301 are similar to the steps 305 through 335 and steps 350 through 360 of the process flow 300 as described with reference to FIG. 3A. Accordingly, the following description of steps 305 through 335 and steps 350 through 360 have been condensed for clarity.

At 305, a mode register write command may be received at the memory system 210. At 310, the configuration data may be written to the one or more mode registers. At 315, first error control information may be generated. At 320, a verification request may be received at the memory system 210. At 325, the verification operation may be initiated at the memory system 210. At 330, the configuration data may be rewritten to the one or more mode registers. At 335, second error control information may be generated.

At 340-*b*, error control information may be transmitted to the host system 205. In some cases, the first error control information may be transmitted to the host system 205. For example, after the verification operation is initiated, the first error control information (e.g., stored at the flip flop 230-*a* described with reference to FIG. 2A) may be transmitted to the transmission component, and the transmission component may transmit the first error control information to the host system 205. In some cases, the flip flop (e.g., flip flop 230-*a*) may be configured to store new error control information based on transmitting the previously stored error control information. In some cases, the verification operation may not include generating the second error control information at step 335 of the process flow 300 (e.g., or step 330 of the process flow 301). In other cases, the first error control information (e.g., stored at flip flop 230-*b*-2 described with reference to FIG. 2B) and the second error control information (e.g., stored at flip flop 230-*b*-1 described with reference to FIG. 2B) may be transmitted to the host system 205. For example, the first error control information and the second error control information may be transmitted from the respective flip flops to the transmission component, and the transmission component may transmit the first error control information and the second error control information to the host system 205.

At 345-*b*, the host system 205 may determine whether one or more errors are present in the configuration data. In cases where the first error control information was transmitted to the host system 205, the host system 205 may use the first error control information to determine whether one or more errors are present in the configuration data. In cases where the first error control information and the second error control information were transmitted to the host system 205, the host system 205 may compare the first error control information and the second error control information to determine whether one or more errors are present in the configuration data. For example, the host system 205 may identify one or more differences (e.g., a mismatch) between the first error control information and the second error control information, thereby determining one or more errors are present in the configuration data. In other cases, the host system 205 may identify the first error control information and the second error control information do not include differences (e.g., match), thereby determining no errors are present in the configuration data. In cases where the host system 205 identified one or more errors are present in the configuration data, the process flow 301 may proceed to step 350. In cases where the host system 205 identified no errors are present in the configuration data, the process flow 301 may return to step 320.

At 350, the memory system 210 may enter a safe mode. The memory system 210 may enter the safe mode based on determining one or more errors are present in the configuration data. In some cases, the memory system 210 may enter the safe mode based on receiving a command from the host system 205 to enter the safe mode. While the memory system 210 is in the safe mode, the memory system 210 may refrain from performing access operations. For example, the memory system 210 may suspend access operations until the configuration data is rewritten to the one or more mode registers.

At 355, the configuration data may be rewritten to the one or more mode registers. For example, the host system 205 may send a new mode register write command to the memory system 210, and the configuration data stored in the one or more mode registers may be rewritten with the configuration data from the new mode register write command. In some cases, the configuration data from the new mode register write command may be corrected or verified (e.g., tested) configuration data, based on determining that the one or more errors are present in the configuration data at step 345-*b* of the process flow 301. In some cases, if one or more errors are discovered in the corrected or verified configuration data, this may provide an indication that the one or more errors are resulting from transmitting the configuration data.

At 360, the memory system 210 may exit the safe mode. The memory system 210 may exit the safe mode based on rewriting the configuration data to the one or more mode registers at step 355 of the process flow 301. In some cases, after exiting the safe mode, the memory system 210 may stop refraining from performing access operations. For example, the memory system 210 may end the suspension of access operations based on rewriting the configuration data to the one or more mode registers.

In accordance with examples as described herein, implementing the process flows 300 and 301 at the system may support error detection and correction of the configuration data. Implementing error detection and correction of the configuration data may prevent data loss of the memory system 210 and support access operations of the memory system 210, among facilitating other operations. Additionally, communicating detected errors between the memory system 210 and the host system 205 may improve transparency and communication of the system, thereby improving reliability of the system, among other advantages.

Figure 4:
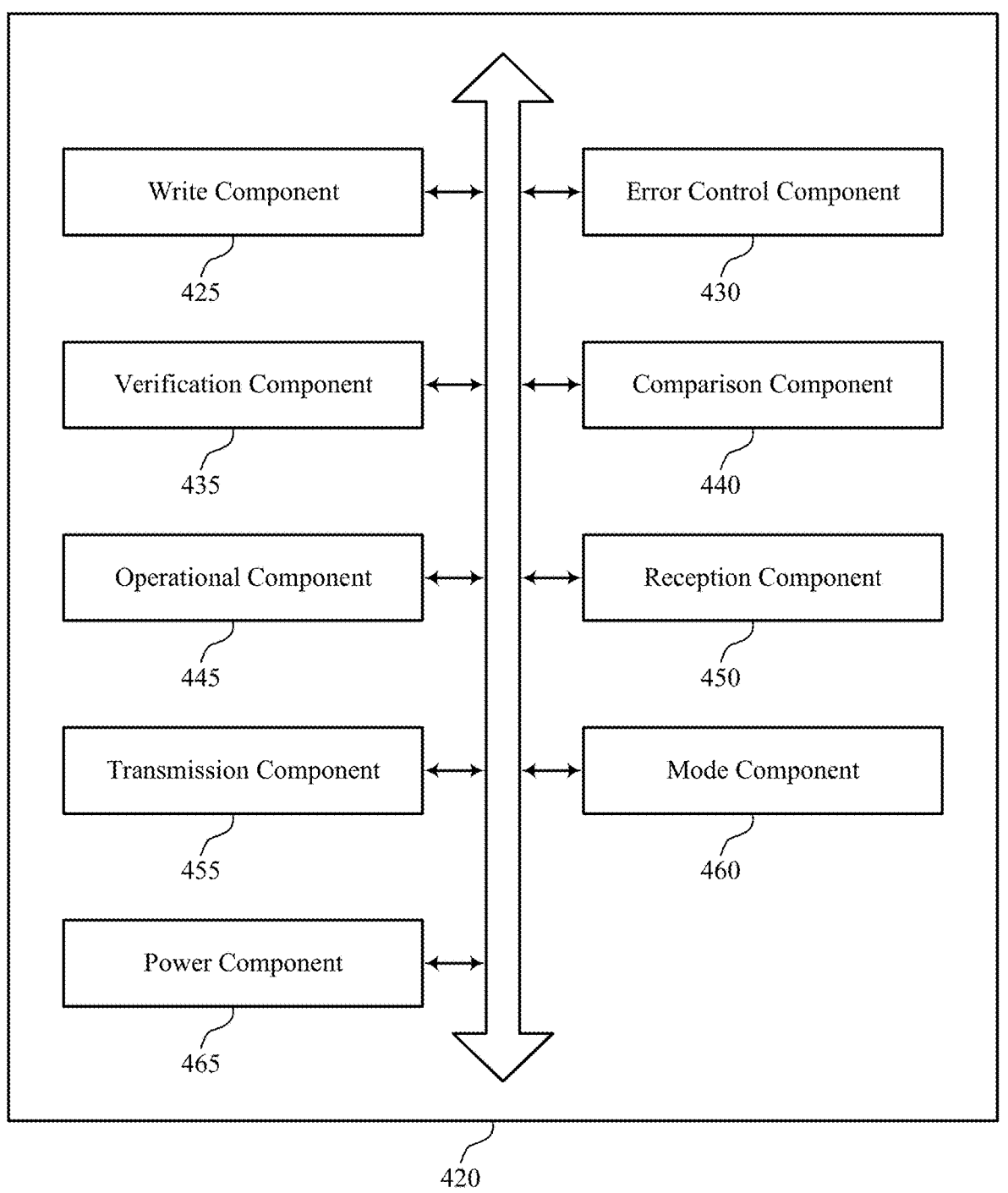
FIG. 4 shows a block diagram of a memory system that supports maintaining integrity of configuration data for memory systems in accordance with examples as disclosed herein.

FIG. 4 shows a block diagram 400 of a memory system 420 that supports maintaining integrity of configuration data for memory systems in accordance with examples as disclosed herein. The memory system 420 may be an example of aspects of a memory system as described with reference to FIGS. 1 through 3B. The memory system 420, or various components thereof, may be an example of means for performing various aspects of maintaining integrity of configuration data for memory systems as described herein. For example, the memory system 420 may include a write component 425, an error control component 430, a verification component 435, a comparison component 440, an operational component 445, a reception component 450, a transmission component 455, a mode component 460, a power component 465, or any combination thereof. Each of these components, or components of subcomponents thereof (e.g., one or more processors, one or more memories), may communicate, directly or indirectly, with one another (e.g., via one or more buses).

The write component 425 may be configured as or otherwise support a means for writing information to one or more mode registers. The error control component 430 may be configured as or otherwise support a means for generating first error control information associated with the information based at least in part on writing the information to the one or more mode registers. The verification component 435 may be configured as or otherwise support a means for initiating a first operation to verify the information written to the one or more mode registers after generating the first error control information. In some examples, the error control component 430 may be configured as or otherwise support a means for generating second error control information associated with the information written to the one or more mode registers based at least in part on initiating the first operation. The comparison component 440 may be configured as or otherwise support a means for determining whether one or more errors are present in the information based at least in part on the first error control information and the second error control information. The operational component 445 may be configured as or otherwise support a means for performing a second operation based at least in part on determining whether the one or more errors are present.

In some examples, to support determining the one or more errors are present, the comparison component 440 may be configured as or otherwise support a means for determining that the one or more errors are present in the information based at least in part on comparing the first error control information with the second error control information.

In some examples, to support performing the second operation, the transmission component 455 may be configured as or otherwise support a means for transmitting an indication of the one or more errors to a host system, based at least in part on determining that the one or more errors are present.

In some examples, to support performing the second operation, the transmission component 455 may be configured as or otherwise support a means for transmitting the first error control information and the second error control information to a host system, where determining that the one or more errors are present is based at least in part on comparing, by the host system, the first error control information with the second error control information.

In some examples, the verification component 435 may be configured as or otherwise support a means for determining whether a periodic duration since a previous determination for whether the one or more errors are present has elapsed, where initiating the first operation is based at least in part on determining that the periodic duration has elapsed.

In some examples, the reception component 450 may be configured as or otherwise support a means for receiving a command to determine whether the one or more errors are present in the information, where initiating the first operation is based at least in part on receiving the command.

In some examples, the generating the second error control information is based at least in part on rewriting the information to the one or more mode registers.

In some examples, the transmission component 455 may be configured as or otherwise support a means for transmitting the first error control information to a host system. In some examples, the comparison component 440 may be configured as or otherwise support a means for determining, by the host system, that the one or more errors are present in the information based at least in part on transmitting the first error control information to the host system.

In some examples, the reception component 450 may be configured as or otherwise support a means for receiving, from a host system, a mode register write command, where writing the information to the one or more mode registers is based at least in part on receiving the mode register write command.

In some examples, the power component 465 may be configured as or otherwise support a means for transitioning a memory device from a lower power state to a higher power state, where receiving the mode register write command is based at least in part on transitioning the memory device from the lower power state to the higher power state.

In some examples, the mode component 460 may be configured as or otherwise support a means for entering a safe mode at the memory device based at least in part on determining that the one or more errors are present in the information, where performing the second operation further includes refraining from performing access operations on the memory device based at least in part on entering the safe mode.

In some examples, the write component 425 may be configured as or otherwise support a means for rewriting the information to the one or more mode registers based at least in part on entering the safe mode. In some examples, the mode component 460 may be configured as or otherwise support a means for exiting the safe mode based at least in part on rewriting the information to the one or more mode registers.

In some examples, the information includes configuration data of a first size, the configuration data associated with operating the memory device. In some examples, the first error control information and the second error control information are a second size different than the first size, the first error control information and the second error control information each including one or more parity bits associated with the information, or one or more checksums associated with the information.

In some examples, the error control component 430 may be configured as or otherwise support a means for generating the first error control information at an error control component based at least in part on inputting the information from the one or more mode registers. In some examples, the error control component 430 may be configured as or otherwise support a means for storing the first error control information to a flip flop coupled with the error control component. In some examples, the transmission component 455 may be configured as or otherwise support a means for transmitting an indication of the first error control information from the flip flop to a host system.

In some examples, the error control component 430 may be configured as or otherwise support a means for receiving signaling at the flip flop, the signaling including a clock signal indicating a frequency for transmitting the indication of the first error control information, where transmitting the indication to the host system is based at least in part on the frequency.

In some examples, the error control component 430 may be configured as or otherwise support a means for storing the first error control information to a first flip flop coupled with the error control component based at least in part on first signaling, where the first error control information and the second error control information are generated by an error control component. In some examples, the error control component 430 may be configured as or otherwise support a means for storing the first error control information to a second flip flop coupled with the error control component based at least in part on second signaling. In some examples, the comparison component 440 may be configured as or otherwise support a means for comparing, at a check component coupled with the first flip flop and the second flip flop, the first error control information and the second error control information based at least in part on the second signaling. In some examples, the transmission component 455 may be configured as or otherwise support a means for transmitting a result of the comparison to a host system based at least in part on the comparison.

In some examples, the error control component 430 may be configured as or otherwise support a means for receiving the first signaling at the error control component based at least in part on writing the information to the one or more mode registers. In some examples, the error control component 430 may be configured as or otherwise support a means for receiving the second signaling at the error control component based at least in part on initiating the first operation to verify the information, where a frequency of the first signaling is different than a frequency of the second signaling.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

FIG. 5 shows a flowchart illustrating a method 500 that supports maintaining integrity of configuration data for memory systems in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include writing information to one or more mode registers. In some examples, aspects of the operations of 505 may be performed by a write component 425 as described with reference to FIG. 4.

At 510, the method may include generating first error control information associated with the information based at least in part on writing the information to the one or more mode registers. In some examples, aspects of the operations of 510 may be performed by an error control component 430 as described with reference to FIG. 4.

At 515, the method may include initiating a first operation to verify the information written to the one or more mode registers after generating the first error control information. In some examples, aspects of the operations of 515 may be performed by a verification component 435 as described with reference to FIG. 4.

At 520, the method may include generating second error control information associated with the information written to the one or more mode registers based at least in part on initiating the first operation. In some examples, aspects of the operations of 520 may be performed by an error control component 430 as described with reference to FIG. 4.

At 525, the method may include determining whether one or more errors are present in the information based at least in part on the first error control information and the second error control information. In some examples, aspects of the operations of 525 may be performed by a comparison component 440 as described with reference to FIG. 4.

At 530, the method may include performing a second operation based at least in part on determining whether the one or more errors are present. In some examples, aspects of the operations of 530 may be performed by an operational component 445 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing information to one or more mode registers; generating first error control information associated with the information based at least in part on writing the information to the one or more mode registers; initiating a first operation to verify the information written to the one or more mode registers after generating the first error control information; generating second error control information associated with the information written to the one or more mode registers based at least in part on initiating the first operation; determining whether one or more errors are present in the information based at least in part on the first error control information and the second error control information; and performing a second operation based at least in part on determining whether the one or more errors are present.

Aspect 2: The method, apparatus, or non-transitory computer-readable medium of aspect 1, where determining the one or more errors are present further includes operations, features, circuitry, logic, means, or instructions, or any combination thereof for determining that the one or more errors are present in the information based at least in part on comparing the first error control information with the second error control information.

Aspect 3: The method, apparatus, or non-transitory computer-readable medium of aspect 2, where performing the second operation further includes operations, features, circuitry, logic, means, or instructions, or any combination thereof for transmitting an indication of the one or more errors to a host system, based at least in part on determining that the one or more errors are present.

Aspect 4: The method, apparatus, or non-transitory computer-readable medium of any of aspects 2 through 3, where performing the second operation further includes operations, features, circuitry, logic, means, or instructions, or any combination thereof for transmitting the first error control information and the second error control information to a host system, where determining that the one or more errors are present is based at least in part on comparing, by the host system, the first error control information with the second error control information.

Aspect 5: The method, apparatus, or non-transitory computer-readable medium of any of aspects 1 through 4, further including operations, features, circuitry, logic, means, or instructions, or any combination thereof for determining whether a periodic duration since a previous determination for whether the one or more errors are present has elapsed, where initiating the first operation is based at least in part on determining that the periodic duration has elapsed.

Aspect 6: The method, apparatus, or non-transitory computer-readable medium of any of aspects 1 through 5, further including operations, features, circuitry, logic, means, or instructions, or any combination thereof for receiving a command to determine whether the one or more errors are present in the information, where initiating the first operation is based at least in part on receiving the command.

Aspect 7: The method, apparatus, or non-transitory computer-readable medium of any of aspects 1 through 6, where the generating the second error control information is based at least in part on rewriting the information to the one or more mode registers.

Aspect 8: The method, apparatus, or non-transitory computer-readable medium of any of aspects 1 through 7, further including operations, features, circuitry, logic, means, or instructions, or any combination thereof for transmitting the first error control information to a host system and determining, by the host system, that the one or more errors are present in the information based at least in part on transmitting the first error control information to the host system.

Aspect 9: The method, apparatus, or non-transitory computer-readable medium of any of aspects 1 through 8, further including operations, features, circuitry, logic, means, or instructions, or any combination thereof for receiving, from a host system, a mode register write command, where writing the information to the one or more mode registers is based at least in part on receiving the mode register write command.

Aspect 10: The method, apparatus, or non-transitory computer-readable medium of aspect 9, further including operations, features, circuitry, logic, means, or instructions, or any combination thereof for transitioning a memory device from a lower power state to a higher power state, where receiving the mode register write command is based at least in part on transitioning the memory device from the lower power state to the higher power state.

Aspect 11: The method, apparatus, or non-transitory computer-readable medium of any of aspects 1 through 10, further including operations, features, circuitry, logic, means, or instructions, or any combination thereof for entering a safe mode at the memory device based at least in part on determining that the one or more errors are present in the information, where performing the second operation further includes refraining from performing access operations on the memory device based at least in part on entering the safe mode.

Aspect 12: The method, apparatus, or non-transitory computer-readable medium of aspect 11, further including operations, features, circuitry, logic, means, or instructions, or any combination thereof for rewriting the information to the one or more mode registers based at least in part on entering the safe mode and exiting the safe mode based at least in part on rewriting the information to the one or more mode registers.

Aspect 13: The method, apparatus, or non-transitory computer-readable medium of any of aspects 1 through 12, where the information includes configuration data of a first size, the configuration data associated with operating the memory device and the first error control information and the second error control information are a second size different than the first size, the first error control information and the second error control information each including one or more parity bits associated with the information, or one or more checksums associated with the information.

Aspect 14: The method, apparatus, or non-transitory computer-readable medium of any of aspects 1 through 13, further including operations, features, circuitry, logic, means, or instructions, or any combination thereof for generating the first error control information at an error control component based at least in part on inputting the information from the one or more mode registers; storing the first error control information to a flip flop coupled with the error control component; and transmitting an indication of the first error control information from the flip flop to a host system.

Aspect 15: The method, apparatus, or non-transitory computer-readable medium of aspect 14, further including operations, features, circuitry, logic, means, or instructions, or any combination thereof for receiving signaling at the flip flop, the signaling including a clock signal indicating a frequency for transmitting the indication of the first error control information, where transmitting the indication to the host system is based at least in part on the frequency.

Aspect 16: The method, apparatus, or non-transitory computer-readable medium of any of aspects 1 through 15, further including operations, features, circuitry, logic, means, or instructions, or any combination thereof for storing the first error control information to a first flip flop coupled with the error control component based at least in part on first signaling, where the first error control information and the second error control information are generated by an error control component; storing the first error control information to a second flip flop coupled with the error control component based at least in part on second signaling; comparing, at a check component coupled with the first flip flop and the second flip flop, the first error control information and the second error control information based at least in part on the second signaling; and transmitting a result of the comparison to a host system based at least in part on the comparison.

Aspect 17: The method, apparatus, or non-transitory computer-readable medium of aspect 16, further including operations, features, circuitry, logic, means, or instructions, or any combination thereof for receiving the first signaling at the error control component based at least in part on writing the information to the one or more mode registers and receiving the second signaling at the error control component based at least in part on initiating the first operation to verify the information, where a frequency of the first signaling is different than a frequency of the second signaling.

It should be noted that the aspects described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component may initiate a change that allows signals to flow between the other components over a conductive path that previously did not permit signals to flow.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

at least one memory device; and at least one controller coupled with the at least one memory device and configured to cause the apparatus to:

write information to one or more mode registers;

generate first error control information associated with the information based at least in part on writing the information to the one or more mode registers;

initiate a first operation to verify the information written to the one or more mode registers after generating the first error control information;

generate second error control information associated with the information written to the one or more mode registers based at least in part on initiating the first operation;

determine whether one or more errors are present in the information based at least in part on the first error control information and the second error control information; and perform a second operation based at least in part on determining whether the one or more errors are present.

2. The apparatus of claim 1, wherein to determine whether the one or more errors are present, the at least one controller is further configured to cause the apparatus to:

determine that the one or more errors are present in the information based at least in part on comparing the first error control information with the second error control information.

3. The apparatus of claim 2, wherein to perform the second operation, the at least one controller is further configured to cause the apparatus to:

transmit an indication of the one or more errors to at least one host system, based at least in part on determining that the one or more errors are present.

4. The apparatus of claim 2, wherein to perform the second operation, the at least one controller is further configured to cause the apparatus to:

transmit the first error control information and the second error control information to at least one host system, wherein determining that the one or more errors are present is based at least in part on comparing, by the at least one host system, the first error control information with the second error control information.

5. The apparatus of claim 1, wherein the at least one controller is further configured to cause the apparatus to:

determine whether a periodic duration since a previous determination for whether the one or more errors are present has elapsed, wherein initiating the first operation is based at least in part on determining that the periodic duration has elapsed.

6. The apparatus of claim 1, wherein the at least one controller is further configured to cause the apparatus to:

receive a command to determine whether the one or more errors are present in the information, wherein initiating the first operation is based at least in part on receiving the command.

7. The apparatus of claim 1, wherein generating the second error control information is based at least in part on rewriting the information to the one or more mode registers.

8. The apparatus of claim 1, wherein the at least one controller is further configured to cause the apparatus to:

transmit the first error control information to at least one host system; and determine, by the at least one host system, that the one or more errors are present in the information based at least in part on transmitting the first error control information to the at least one host system.

9. The apparatus of claim 1, wherein the at least one controller is further configured to cause the apparatus to:

receive, from at least one host system, a mode register write command, wherein writing the information to the one or more mode registers is based at least in part on receiving the mode register write command.

10. The apparatus of claim 9, wherein the at least one controller is further configured to cause the apparatus to:

transition the at least one memory device from a lower power state to a higher power state, wherein receiving the mode register write command is based at least in part on transitioning the at least one memory device from the lower power state to the higher power state.

11. The apparatus of claim 1, wherein the at least one controller is further configured to cause the apparatus to:

enter a safe mode at the at least one memory device based at least in part on determining that the one or more errors are present in the information, wherein performing the second operation further comprises refraining from performing access operations on the at least one memory device based at least in part on entering the safe mode.

12. The apparatus of claim 11, wherein the at least one controller is further configured to cause the apparatus to:

rewrite the information to the one or more mode registers based at least in part on entering the safe mode; and exit the safe mode based at least in part on rewriting the information to the one or more mode registers.

13. The apparatus of claim 1, wherein:

the information comprises configuration data of a first size, the configuration data associated with operating the at least one memory device, and the first error control information and the second error control information are a second size different than the first size, the first error control information and the second error control information each comprising one or more parity bits associated with the information, or one or more checksums associated with the information.

14. The apparatus of claim 1, wherein the at least one controller is further configured to cause the apparatus to:

generate the first error control information at one or more error control components based at least in part on inputting the information from the one or more mode registers;

store the first error control information to at least one flip flop coupled with the one or more error control components; and transmit an indication of the first error control information from the at least one flip flop to at least one host system.

15. The apparatus of claim 14, wherein the at least one controller is further configured to cause the apparatus to:

receive signaling at the at least one flip flop, the signaling comprising at least one clock signal indicating a frequency for transmitting the indication of the first error control information, wherein transmitting the indication to the at least one host system is based at least in part on the frequency.

16. The apparatus of claim 1, wherein the at least one controller is further configured to cause the apparatus to:

store the first error control information to at least one first flip flop coupled with one or more error control components based at least in part on first signaling, wherein the first error control information and the second error control information are generated by the one or more error control components;

store the first error control information to at least one second flip flop coupled with the one or more error control components based at least in part on second signaling;

compare, at one or more check components coupled with the at least one first flip flop and the at least one second flip flop, the first error control information and the second error control information based at least in part on the second signaling; and transmit a result of comparing the first error control information and the second error control information to at least one host system based at least in part on comparing the first error control information and the second error control information.

17. The apparatus of claim 16, wherein the at least one controller is further configured to cause the apparatus to:

receive the first signaling at the one or more error control components based at least in part on writing the information to the one or more mode registers; and receive the second signaling at the one or more error control components based at least in part on initiating the first operation to verify the information, wherein a frequency of the first signaling is different than a frequency of the second signaling.

18. A non-transitory computer-readable medium storing code, the code comprising instructions executable by a processor to:

write information to one or more mode registers;

generate first error control information associated with the information based at least in part on writing the information to the one or more mode registers;

initiate a first operation to verify the information written to the one or more mode registers after generating the first error control information;

generate second error control information associated with the information written to the one or more mode registers based at least in part on initiating the first operation;

determine whether one or more errors are present in the information based at least in part on the first error control information and the second error control information; and perform a second operation based at least in part on determining whether the one or more errors are present.

19. The non-transitory computer-readable medium of claim 18, wherein the instructions to perform the second operation are further executable by the processor to:

transmit the first error control information and the second error control information to a host system, wherein determining that the one or more errors are present is based at least in part on comparing, by the host system, the first error control information with the second error control information.

20. A method, comprising:

writing information to one or more mode registers;

generating first error control information associated with the information based at least in part on writing the information to the one or more mode registers;

initiating a first operation to verify the information written to the one or more mode registers after generating the first error control information;

generating second error control information associated with the information written to the one or more mode registers based at least in part on initiating the first operation;

determining whether one or more errors are present in the information based at least in part on the first error control information and the second error control information; and performing a second operation based at least in part on determining whether the one or more errors are present.

* * * * *